United States Patent

Ito

(10) Patent No.: US 9,722,461 B2
(45) Date of Patent: Aug. 1, 2017

(54) PRINTING APPARATUS, METHOD FOR CONTROLLING THE SAME, AND PROGRAM

(71) Applicant: CANON KABUSHIKI KAISHA, Tokyo (JP)

(72) Inventor: Akio Ito, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 515 days.

(21) Appl. No.: 14/191,238

(22) Filed: Feb. 26, 2014

(65) Prior Publication Data

US 2014/0239731 A1    Aug. 28, 2014

(30) Foreign Application Priority Data

Feb. 28, 2013  (JP) .................. 2013-039126

(51) Int. Cl.
| | |
|---|---|
| H02J 17/00 | (2006.01) |
| H02J 7/02 | (2016.01) |
| H02J 7/04 | (2006.01) |
| H04B 5/00 | (2006.01) |

(52) U.S. Cl.
CPC .............. H02J 17/00 (2013.01); H02J 7/025 (2013.01); H02J 7/045 (2013.01); H04B 5/0037 (2013.01)

(58) Field of Classification Search
CPC . H02J 17/00; H02J 7/045; H02J 7/025; H04B 5/0037
USPC ......................................................... 307/104
See application file for complete search history.

(56) References Cited

U.S. PATENT DOCUMENTS

| | | | | |
|---|---|---|---|---|
| 2009/0224723 A1* | 9/2009 | Tanabe | .................... | H02J 7/025 320/108 |
| 2012/0025624 A1* | 2/2012 | Lee | .......................... | H02J 7/025 307/104 |

FOREIGN PATENT DOCUMENTS

| | | |
|---|---|---|
| JP | 2005-278273 A | 10/2005 |
| JP | 2006-159778 A | 6/2006 |
| JP | 2009-501000 A | 1/2009 |
| JP | 2011-169043 A | 9/2011 |
| JP | 2012-14422 A | 1/2012 |
| JP | 2012-507978 A | 3/2012 |
| JP | 2012-139033 A | 7/2012 |
| JP | 2012-517213 A | 7/2012 |
| JP | 2013-005433 A | 1/2013 |

* cited by examiner

*Primary Examiner* — Rexford Barnie
*Assistant Examiner* — Toan Vu
(74) *Attorney, Agent, or Firm* — Canon U.S.A., Inc. IP Division

(57) ABSTRACT

A digital multifunction peripheral including a contactless power feeding unit having a function of communicating with a terminal apparatus and a function of feeding the power in a contactless manner to the terminal apparatus is configured to detect a status of the digital multifunction peripheral, detect the presence or absence of a power receiving apparatus capable of communicating with the contactless power feeding unit, and, when such a power receiving apparatus is present, detect the status of the power receiving apparatus, and perform power-saving control based on the result of the detections.

5 Claims, 11 Drawing Sheets

FIG.6

| | | POWER SUPPLY MODES | | | | |
|---|---|---|---|---|---|---|
| | | POWER OFF | POWER-SAVING MODE STANDBY | POWER-SAVING MODE WIRELESS POWER FEEDING OFF | POWER-SAVING MODE READER AND PRINTER OFF | STANDARD MODE POWER ON |
| POWER SUPPLY STATES | POWER SOURCE 1 | OFF | ON | ON | ON | ON |
| | POWER SOURCE 2 | OFF | OFF | ON | ON | ON |
| | POWER SOURCE 3 | OFF | OFF | OFF | OFF | ON |
| | POWER SOURCE 4 | OFF | OFF | OFF | OFF | ON |
| | POWER SOURCE 5 | OFF | OFF | ON | ON | ON |
| | POWER SOURCE 6 | OFF | OFF | OFF | ON | ON |

PRINTING APPARATUS, METHOD FOR CONTROLLING THE SAME, AND PROGRAM

BACKGROUND OF THE INVENTION

Field of the Invention

The present invention relates to an electronic apparatus having a contactless power feeding method including a function of communicating with a power receiving apparatus and a function of feeding the power in a contactless manner to the power receiving apparatus.

Description of the Related Art

Conventionally, a digital multifunction peripheral having a printing function performs power-saving control to reduce power consumption. In power-saving control, for example, when the digital multifunction peripheral is in the standby state where the printing function is not used, only a portion for returning to the printing state is activated to reduce power consumption of other portions.

Meanwhile, as a method for transmitting the power between apparatuses, there has been achieved a contactless power feeding technique for transmitting and receiving the power in a contactless manner between a transmitter and a receiver located within a short range.

For example, Japanese Patent Application Laid-Open No. 2005-278273 discusses a configuration in which a central processing unit of a contactless rechargeable information terminal apparatus shifts to a low power consumption state except for the time of detecting a voltage for charging at predetermined intervals during a charging operation. This configuration is aimed at preventing a charging period from being prolonged by the current consumed by operations of the central processing unit during the charging operation.

Japanese Patent Application Laid-Open No. 2012-14422 discusses a configuration in which data to be written to a firmware is wirelessly transmitted to a terminal apparatus activated in wireless power feed processing and, when writing is completed, wireless power feeding is stopped. This configuration is aimed at improving the updating workability of the firmware of a product, such as a terminal apparatus.

SUMMARY OF THE INVENTION

However, in the configuration discussed in Japanese Patent Application Laid-Open No. 2005-278273, by a limitation of operations of the central processing unit of the terminal apparatus, the charging period is shortened, therefore a problem of reducing the power remains on the feeding side.

The configuration discussed in Japanese Patent Application Laid-Open No. 2012-14422 achieves wireless power feeding required to update the firmware but has a problem about controlling when the terminal apparatus needs to be charged.

The present invention is directed to enabling an electronic apparatus having a contactless power feeding function to perform power-saving control for reducing power consumption depending on the status of the electronic apparatus and the status of a power receiving apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates power supply states of a digital multifunction peripheral according to an exemplary embodiment.

DESCRIPTION OF THE EMBODIMENTS

Various exemplary embodiments, features, and aspects of the invention will be described in detail below with reference to the drawings.

Although, in the present exemplary embodiment, a digital multifunction peripheral is described as an example of an electronic apparatus according to the present invention, the electronic apparatus is not limited thereto.

(Overall Configuration)

Figure 1:
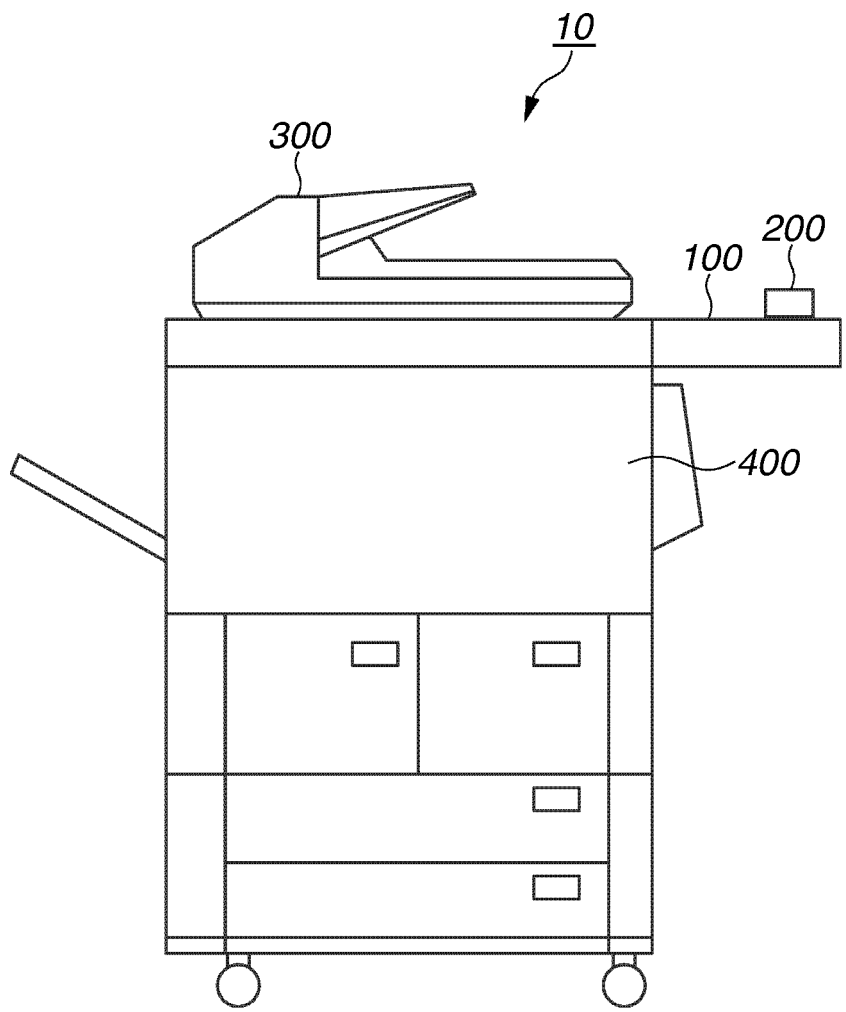
FIG. 1 is an external view illustrating a digital multifunction peripheral according to an exemplary embodiment.

FIG. 1 is an external view illustrating a digital multifunction peripheral (MFP) 10 according to an exemplary embodiment of the present invention.

The digital MFP 10 includes a contactless power feeding unit 100 having a communication function and a contactless power feeding function, a reader unit 300 as an image input device, and a printer unit 400 as an image output device.

Figure 2:
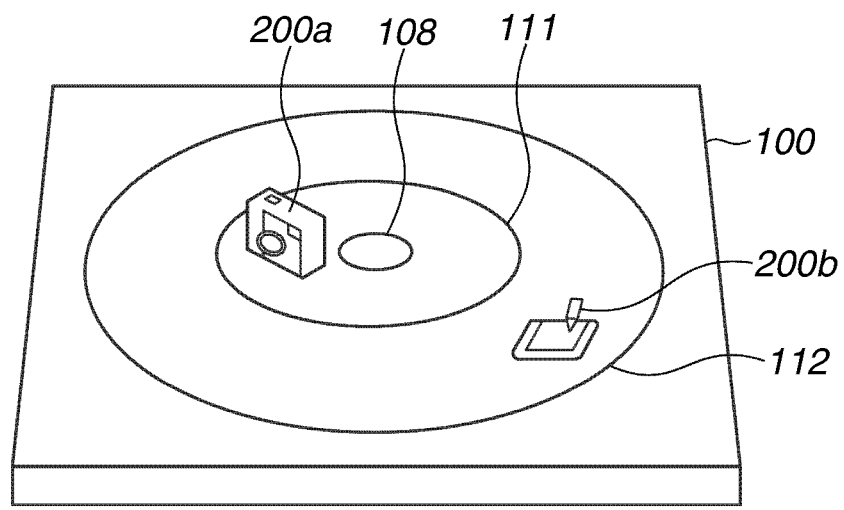
FIG. 2 is a conceptual view illustrating a power feeding zone and a communication zone of a contactless power feeding unit.

The contactless power feeding unit 100 wirelessly transmits the power to a terminal apparatus 200 placed thereon. FIG. 2 is a perspective external view illustrating the contactless power feeding unit 100 illustrated in FIG. 1. Placing the terminal apparatus 200 on the contactless power feeding unit 100 enables performing contactless power feeding to the terminal apparatus 200. A radio antenna 108 is disposed at the central position of the contactless power feeding unit 100, and performs communication with the terminal apparatus 200 and contactless power feeding to the terminal apparatus 200. Communication and wireless power feeding are possible in an area 111 (hereinafter referred to as a communication and wireless power feeding feasible area 111). Only communication is possible in an area 112 (hereinafter referred to as a communication feasible area 112). Referring to FIG. 2, the terminal apparatus 200a is placed in the communication and wireless power feeding feasible area 111, and the terminal apparatus 200b is placed in the communication feasible area 112.

The reader unit 300 automatically reads a document.

The printer unit 400 prints an image read by the reader unit 300 and print data received via a network (not illustrated)

(Digital Multifunction Peripheral)

Figure 3:
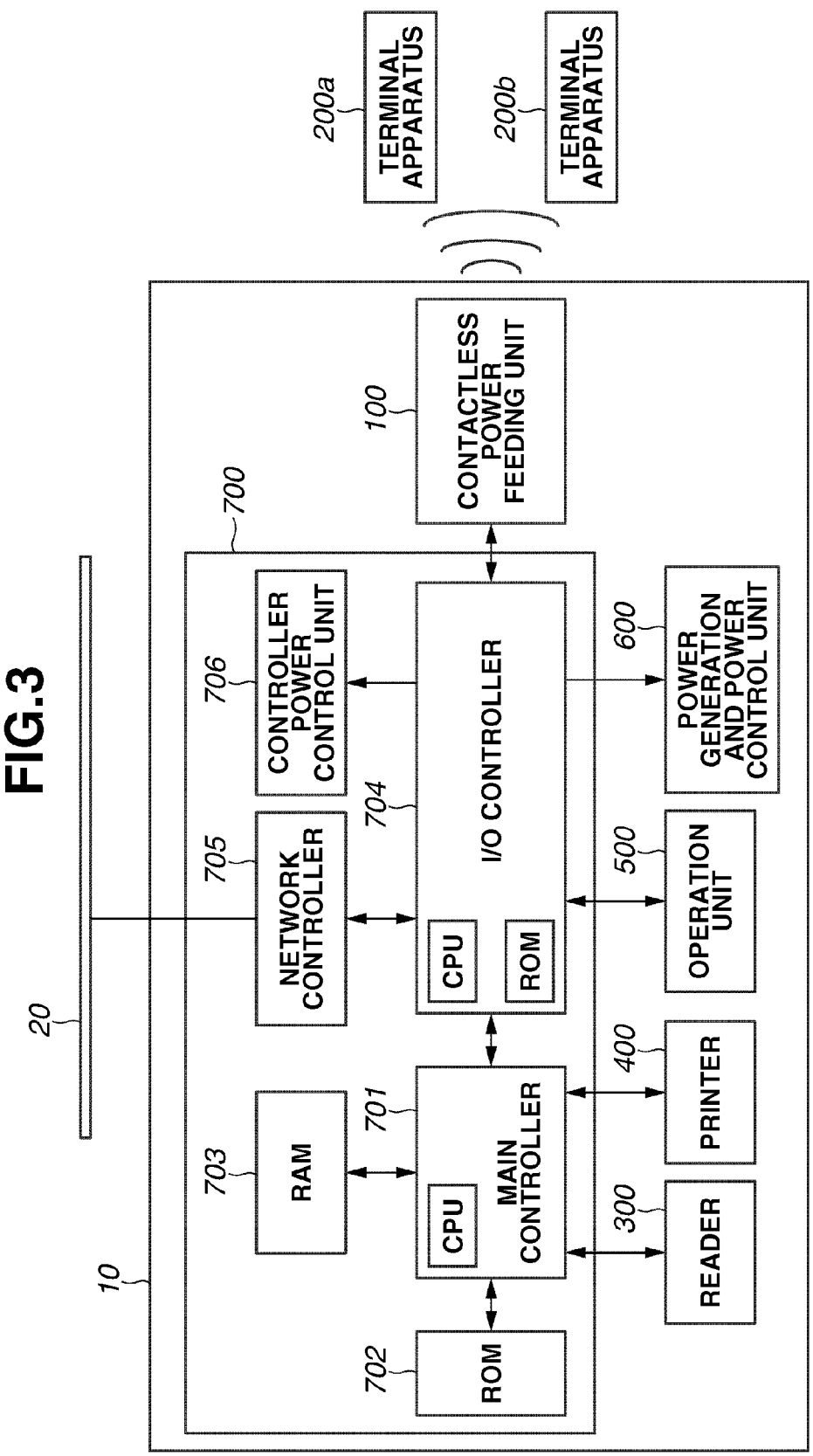
FIG. 3 is a block diagram illustrating a configuration of a digital multifunction peripheral according to an exemplary embodiment.

FIG. 3 is a block diagram illustrating the configuration of the digital MFP 10.

The digital MFP 10 is connected to a network 20, and performs data print processing and data transmission and reception processing in response to an instruction from a personal computer (PC) (not illustrated) connected to the network 20.

In addition to the above-described contactless power feeding unit 100, the reader unit 300, and the printer unit 400, the digital MFP 10 further includes an operation unit 500, a power generation and power control unit 600, and a controller unit 700.

The controller unit 700 is connected to the reader unit 300 and the printer unit 400. The controller unit 700 is connected to the operation unit 500, and detects an operator instruction and performs various types of processing. The controller unit 700 is capable of flexibly performing data transmission and reception via the network 20.

The controller unit 700 includes a main controller 701 (a controller integrated circuit (IC)) which includes a central processing unit (CPU) core and an image processing block, and controls the entire system. A random access memory (RAM) 703 is a system work memory used for operations of the main controller 701, and serves also as an image memory for temporarily storing image data. A read-only memory (ROM) 702 stores a system program. An input/output (I/O) controller 704 is connected to the main controller 701 via a system bus for transmitting and receiving communication data, image data, etc. at high speed. The I/O controller 704 controls various types of I/O devices. The I/O controller 704 includes a CPU and a ROM. The CPU controls I/O devices according to programs stored in the ROM. The main controller 701 executes programs stored in the ROM 702 to control the I/O controller 704 which controls I/O devices connected thereto. A network controller 705 is connected with a wired or wireless external network to enable communication with the external network. A controller power control unit 706 performs power control within the controller unit 700, not within the digital MFP 10.

The reader unit 300 reads a document image, converts it into image data, and supplies it to the main controller 701 of the controller unit 700. The main controller 701 temporarily stores the image data in the RAM 703. The main controller 701 includes a block for performing image compression, decompression, and rotation processing, and accesses the image data stored in the RAM 703 to perform various types of processing on the image data. The main controller 701 transfers the compressed image data to the RAM 703 to store it. The main controller 701 reads the image data stored in the RAM 703, and performs decompression processing on the image data. Then, the printer unit 400 forms an image on paper based on the decompressed image data.

The printer unit 400 mainly converts image data into an image on paper. Although image forming processes include the electrophotographic process using photosensitive drums and a photosensitive belt, and the ink jet process using a minute nozzle array discharging ink onto paper to directly print an image thereon, any image forming process is applicable to the present invention.

The operation unit 500 receives user settings made by a user for the digital MFP 10. When the operation unit 500 detects an operator's key input, it notifies the main controller 701 of the key input via the I/O controller 704. The main controller 701 detects the received input, determines the input, and advances processing to the next one. The operation unit 500 includes a display unit (not illustrated), and displays image data on the display unit via the I/O controller 704.

The power generation and power control unit 600 performs power generation and power supply control for the entire digital MFP 10. This power control enables power-saving which achieves optimum power consumption in operations of the digital MFP 10. The power control by the power generation and power control unit 600 is achieved via the I/O controller 704 when the main controller 701 executes a relevant program stored in the ROM 702. The power control is also achieved when the CPU of the I/O controller 704 executes a relevant program stored in the ROM in the I/O controller 704. Even when the main controller 701 is not operating, the I/O controller 704 is able to perform the power control.

(Contactless Power Feeding Unit and Terminal Apparatus)

Figure 4:
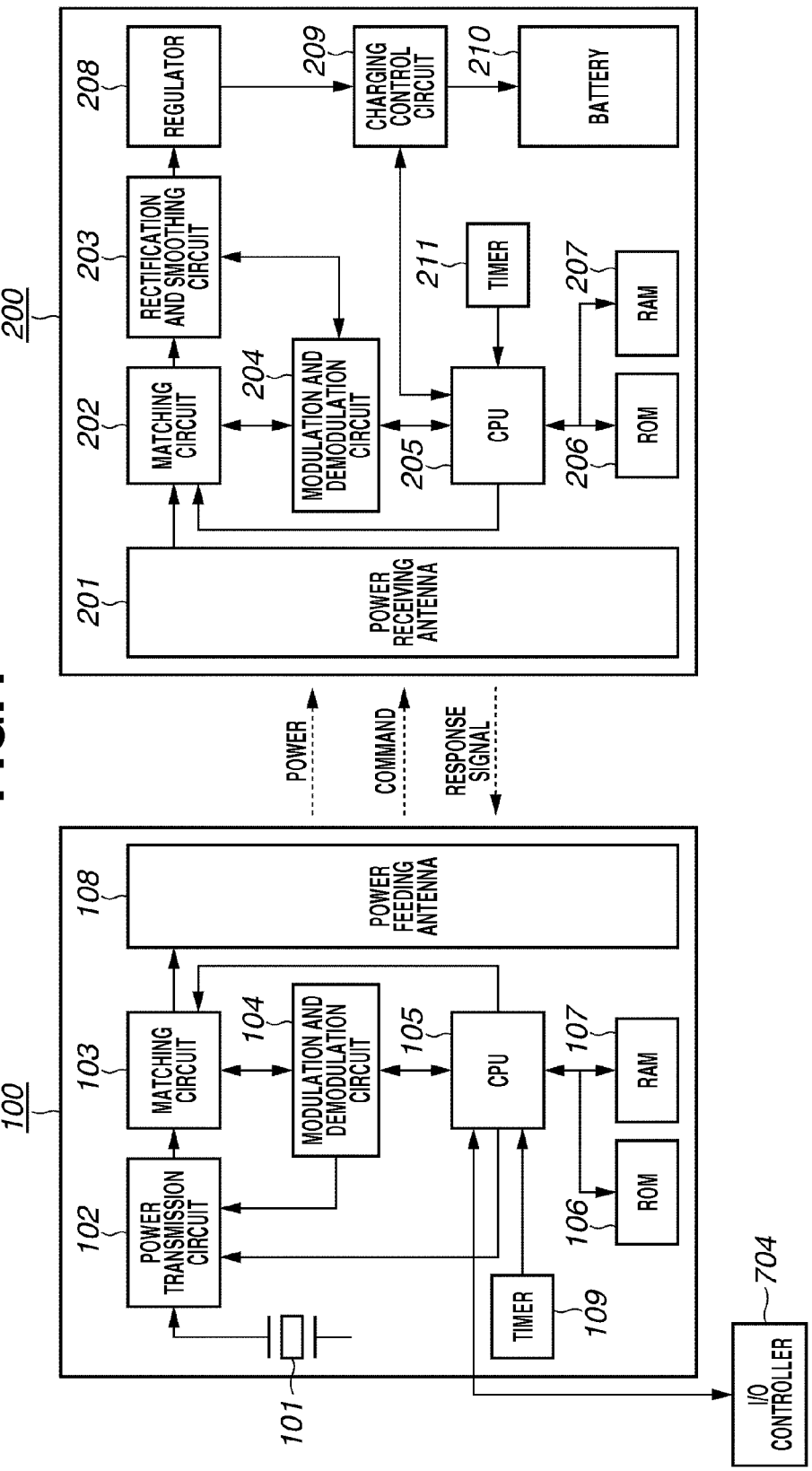
FIG. 4 is a block diagram illustrating configurations of a contactless power feeding unit and a terminal apparatus according to an exemplary embodiment.

FIG. 4 is a block diagram illustrating the configurations of the contactless power feeding unit 100 and the terminal apparatus 200. The terminal apparatus 200 may be a digital still camera, a mobile phone, a digital camcorder, a music player, etc. as long as it is an electronic apparatus operating on the power supplied from a battery 210.

The contactless power feeding unit 100 includes the power feeding antenna 108, and transmits the power in a contactless manner to the terminal apparatus 200 via the power feeding antenna 108. The terminal apparatus 200 further includes a power receiving antenna 201, and receives in a contactless manner the power transmitted from the contactless power feeding unit 100 via the power receiving antenna 201. The terminal apparatus 200 charges the battery 210 attached thereto by using the power received from the contactless power feeding unit 100 via the power receiving antenna 201.

When the distance from the contactless power feeding unit 100 is within a predetermined range (the communication and wireless power feeding feasible area 111 illustrated in FIG. 2), the terminal apparatus 200 can receive the power from the contactless power feeding unit 100. Otherwise, when the distance from the contactless power feeding unit 100 is not within the predetermined range, the terminal apparatus 200 cannot receive the power from the contactless power feeding unit 100. Since it is not necessary to feed the power at the time of communication, an area in which communication is possible can be made wider than the communication and wireless power feeding feasible area 111 (the communication feasible area 112 illustrated in FIG. 2).

The contactless power feeding unit 100 includes an oscillator 101, a power transmission circuit 102, a matching circuit 103, a modulation and demodulation circuit 104, a CPU 105, a ROM 106, a RAM 107, a power feeding antenna 108, and a timer 109.

The oscillator 101 oscillates to generate a high frequency to be used to feed the power corresponding to a target value determined by the CPU 105 to the terminal apparatus 200. The oscillator 101 uses, for example, a crystal oscillator.

According to the frequency generated by the oscillator 101, the power transmission circuit 102 generates the power to be supplied to the terminal apparatus 200 via the power feeding antenna 108. The power transmission circuit 102 includes a field-effect transistor (FET), etc., and controls the current flowing between the source and drain terminals of the FET according to the frequency generated by the oscillator 101 to provide the power to be supplied to the terminal apparatus 200. The power generated by the power transmission circuit 102 is supplied to the matching circuit 103.

The matching circuit 103 is a resonance circuit for performing impedance matching between the power transmission circuit 102 and the power feeding antenna 108 to produce resonance between the power feeding antenna 108 and the power receiving antenna 201 with the frequency generated by the oscillator 101. The CPU 105 controls the matching circuit 103 to change the frequency generated by the oscillator 101 to a frequency which produces resonance between the power feeding antenna 108 and the power receiving antenna 201. The frequency for producing resonance between the power feeding antenna 108 and the power receiving antenna 201 is hereinafter referred to as "resonance frequency f".

The CPU 105 controls the matching circuit 103 to change the value of the inductance L of the matching circuit 103 and the capacitance C of the matching circuit 103 so that the frequency generated by the oscillator 101 becomes the predetermined resonance frequency f. The CPU 105 is further able to control the matching circuit 103 to change the Q1 value which is used to control how much power out of the power generated by the power transmission circuit 102 is to be transmitted to the terminal apparatus 200. The Q1 value indicates the resonance characteristics, i.e., the sharpness of the resonance characteristics. The CPU 105 is further able to control the matching circuit 103 to change the Q1 value to control the power to be transmitted to the terminal apparatus 200. The Q1 value indicates the resonance characteristics on the side of the contactless power feeding unit 100, i.e., the sharpness of the peak of the resonance frequency f. The Q1 value is used by the CPU 105 to control how much power out of the power generated by the power transmission circuit 102 is to be transmitted to the terminal apparatus 200. The CPU 105 controls the Q1 value according to predetermined values A1, A2, and A3 stored in the RAM 107. The predetermined values A1, A2, and A3 have a magnitude relation of A3 >A1 >A2. When the contactless power feeding unit 100 transmits a command to control the terminal apparatus 200, to the terminal apparatus 200, the CPU 105 controls the matching circuit 103 so that the Q1 value becomes the predetermined value A1 or below and the predetermined value A2 or above. In this case, the power generated by the power transmission circuit 102 provides a large thermal loss in the matching circuit 103. Therefore, the contactless power feeding unit 100 shows decreased feeding efficiency of the power transmitted to the terminal apparatus 200 and therefore cannot transmit large power to the terminal apparatus 200. When transmitting large power to the terminal apparatus 200, the CPU 105 controls the matching circuit 103 so that the Q1 value becomes the predetermined value A3 or below and the predetermined value A1 or above. In this case, since the efficiency of communication between the contactless power feeding unit 100 and the terminal apparatus 200 decreases, the contactless power feeding unit 100 cannot transmit a command to control the terminal apparatus 200, to the terminal apparatus 200.

The matching circuit 103 can detect change in the current flowing in the power feeding antenna 108 and the voltage supplied to the power feeding antenna 108.

The modulation and demodulation circuit 104 modulates the power generated by the power transmission circuit 102 based on a predetermined protocol, to transmit a command to control the terminal apparatus 200, to the terminal apparatus 200. The predetermined protocol is, for example, the ISO14443 or ISO1563 communication protocol used for Radio Frequency Identification (RFID). The modulation and demodulation circuit 104 converts the power generated by the power transmission circuit 102 into a pulse signal as a command to communicate with the terminal apparatus 200. The pulse signal is transmitted to the terminal apparatus 200. The terminal apparatus 200 analyzes the transmitted pulse signal to recognize it as bit data including "1" and "0" information. A command includes information for identifying the destination address, and a command code indicating an operation specified by the command. The modulation and demodulation circuit 104 converts the power generated by the power transmission circuit 102 into a pulse signal through the amplitude shift keying (ASK) modulation method based on the amplitude displacement. The ASK modulation method is based on the amplitude displacement, and is used for communication between an IC card and a card reader for communicating in a contactless manner with the IC card. The modulation and demodulation circuit 104 modulates the power generated by the power transmission circuit 102 with a predetermined modulation factor (degree of amplitude modulation) represented by the Q1 value. The modulation and demodulation circuit 104 switches an analog multiplier and a resistive load included therein to enable changing of the amplitude of the power generated by the power transmission circuit 102. The modulation and demodulation circuit 104 includes a coding circuit based on a predetermined coding method.

After transmitting a command to the terminal apparatus 200, the modulation and demodulation circuit 104 can demodulate a response signal from the terminal apparatus 200 as a response to the command transmitted to the terminal apparatus 200 according to change in the current flowing in the power feeding antenna 108 detected by the matching circuit 103. Thus, the modulation and demodulation circuit 104 can receive from the terminal apparatus 200 a response signal as a response to a command transmitted to the terminal apparatus 200 through a load modulation method. The modulation and demodulation circuit 104 transmits a command to the terminal apparatus 200 in response to an instruction from the CPU 105. Upon reception of a response signal from the terminal apparatus 200, the modulation and demodulation circuit 104 supplies the received response signal to the CPU 105.

The CPU 105 controls the operation of each unit of the contactless power feeding unit 100 by executing a computer program stored in the ROM 106. The CPU 105 controls the power transmission circuit 102, to control the power to be supplied to the terminal apparatus 200. The CPU 105 further controls the modulation and demodulation circuit 104 to transmit a command to the terminal apparatus 200. The CPU 105 further controls the matching circuit 103 to control the contactless power feeding unit 100 to resonate with the terminal apparatus 200. The CPU 105 further controls the matching circuit 103 to differentiate the Q1 value between the case of command transmission and the case of power transmission. The CPU 105 has a communication unit (not illustrated) for communicating with the terminal apparatus 200 via a command and a response for the command. The communication unit (not illustrated) controls the oscillator 101, the power transmission circuit 102, the matching circuit 103, and the modulation and demodulation circuit 104 to communicate with the terminal apparatus 200.

The ROM 106 stores computer programs for controlling the operation of each unit of the contactless power feeding unit 100, and information about parameters related to the operation of each unit thereof.

The RAM 107 is a rewritable nonvolatile memory, and temporarily stores computer programs for controlling the operation of each unit of the contactless power feeding unit 100, information about parameters related to the operation of each unit thereof, and information received from the terminal apparatus 200 by the modulation and demodulation circuit 104. The RAM 107 further stores information about the current Q1 value and the resonance frequency f.

The power feeding antenna 108 is a loop antenna wound several times.

The timer 109 measures the present time and time related to the operation of each unit.

The terminal apparatus 200 includes the power receiving antenna 201, a matching circuit 202, a rectification and smoothing circuit 203, a modulation and demodulation circuit 204, a CPU 205, a ROM 206, a RAM 207, a regulator 208, a charging control circuit 209, a battery 210, and a timer 211.

The power receiving antenna 201 is a loop antenna wound several times, and receives the power supplied from the contactless power feeding unit 100.

The matching circuit 202 is a resonance circuit for performing impedance matching. Specifically, the matching circuit 202 controls the inductance and capacitance values of the matching circuit 202 so that the power receiving antenna 201 resonates at the same frequency as the resonance frequency f of the contactless power feeding unit 100.

The rectification and smoothing circuit 203 eliminates a command and noise from the power received by the power receiving antenna 201 to generate direct-current (DC) power for charging the battery 210. The rectification and smoothing circuit 203 supplies the generated DC power to the regulator 208. The rectification and smoothing circuit 203 supplies to the modulation and demodulation circuit 204 the command extracted from the power received by the power receiving antenna 201. The rectification and smoothing circuit 203 includes a rectification diode, and generates DC power either through full-wave rectification or half-wave rectification.

The modulation and demodulation circuit 204 analyzes the command supplied from the rectification and smoothing circuit 203 according to a predetermined communication protocol for communication with the contactless power feeding unit 100, and supplies the command analysis result to the CPU 205.

The CPU 205 determines the type of the received command based on the analysis result supplied from the modulation and demodulation circuit 204, and performs an operation specified by a command code corresponding to the received command. The CPU 205 further executes computer programs stored in the ROM 206 to control the operation of each unit of the terminal apparatus 200. The CPU 205 further controls the matching circuit 202 to control the terminal apparatus 200 to resonate with the contactless power feeding unit 100. The CPU 205 includes a communication unit (not illustrated) for communicating with the contactless power feeding unit 100 by using a command and a response in response to the command. The communication unit (not illustrated) controls the matching circuit 202, the rectification and smoothing circuit 203, and the modulation and demodulation circuit 204 to communicate with the contactless power feeding unit 100.

The ROM 206 stores computer programs for controlling the operation of each unit of the terminal apparatus 200, and information about parameters related to operations thereof. The ROM 206 further stores identification information of the terminal apparatus 200 and performance information of the terminal apparatus 200. The identification information of the terminal apparatus 200 includes ID information, a manufacturer name, a device name, a date of manufacture, etc. of the terminal apparatus 200. The performance information of the terminal apparatus 200 includes information about how much power can be received by the terminal apparatus 200 and information about the Q1 value with which the command can be received from the contactless power feeding unit 100.

The RAM 207 is a rewritable nonvolatile memory, and temporarily stores computer programs for controlling the operation of each unit of the terminal apparatus 200, information about parameters related to the operation of each unit, and information received from the terminal apparatus 200 by the modulation and demodulation circuit 104.

The regulator 208 controls the voltage of the DC power supplied from the rectification and smoothing circuit 203 to become the voltage value set by the CPU 205. The regulator 208 may be either a switching regulator or a linear regulator. The regulator 208 controls the DC power from the rectification and smoothing circuit 203 to become the voltage value set by the CPU 205, and supplies the controlled DC power to the charging control circuit 209. The regulator 208 further controls the voltage of the power supplied from the battery 210 to become the voltage value set by the CPU 205. The regulator 208 controls the DC power from the battery 210 to become the voltage value set by the CPU 205, and supplies the controlled DC power at least to the CPU 205, the ROM 206, and the RAM 207.

When the DC power is supplied from the regulator 208 to the charging control circuit 209, the charging control circuit 209 charges the battery 210. Thus, the terminal apparatus 200 charges the battery 210 by using the DC power supplied to the charging control circuit 209 via the regulator 208. The voltage used by the terminal apparatus 200 to charge the battery 210 is referred to as "charging voltage". The current used by the terminal apparatus 200 to charge the battery 210 is referred to as "charging current". When the terminal apparatus 200 starts charging the battery 210, the charging control circuit 209 performs constant-current control to control the charging current flowing in the battery 210 to become a predetermined current value. While the charging control circuit 209 is performing constant-current control, the charging voltage supplied to the battery 210 increases along with elapsed time since the start of the constant-current control. During the constant-current control, when the charging voltage supplied to the battery 210 reaches a predetermined voltage value, the charging control circuit 209 performs constant-current control to control the charging voltage supplied to the battery 210 so that the charging voltage reaches a predetermined voltage value. While the charging control circuit 209 is performing constant-voltage control, the charging current flowing in the battery 210 decreases along with elapsed time since the start of the constant-voltage control. When the charging current flowing in the battery 210 has decreased to almost 0, charge of the battery 210 has been finished, and therefore the charging control circuit 209 stops charging the battery 210. The charging control circuit 209 further periodically detects information about the remaining capacity of the attached battery 210, and supplies the information to the CPU 205. The CPU 205 stores in the RAM 207 the information about the remaining capacity of the battery 210 supplied from the charging control circuit 209.

The battery 210 is a rechargeable secondary battery detachably attached to the terminal apparatus 200, for example, a lithium ion battery.

The timer 211 measures the present time and time related to the operation of each unit.

(Power Source Configuration)

Figure 5:
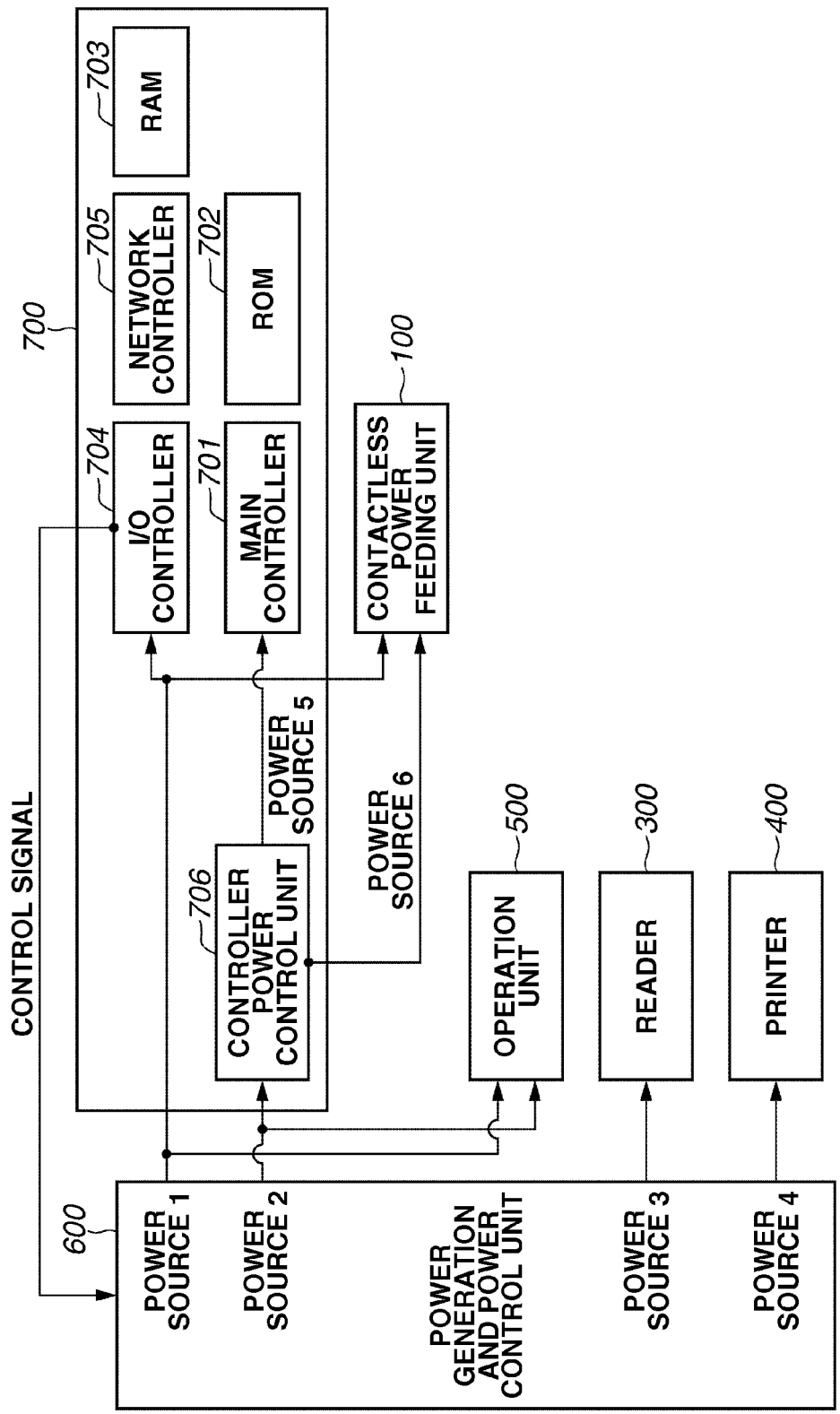
FIG. 5 is a block diagram illustrating a power source configuration of a digital multifunction peripheral according to an exemplary embodiment.

FIG. 5 is a block diagram illustrating the power source configuration of the digital MFP 10.

The power generation and power control unit 600 generates the DC power for the entire digital MFP 10, and controls the power supply to each unit. The power generation and power control unit 600 is controlled by the I/O controller 704. The power generation and power control unit 600 outputs the DC power for power sources 1 to 6. When a switch (not illustrated) of the digital MFP 10 is turned ON, the power generation and power control unit 600 outputs the power source 1. The outputs of the power sources 2 to 5 can be independently controlled in response to an instruction of the I/O controller 704.

The power source 1 which is an output of the power generation and power control unit 600, is supplied to the I/O controller 704, the contactless power feeding unit 100, and the operation unit 500. The power source 1 is supplied even in the power-saving mode in which power consumption is reduced.

The power source 2 which is an output of the power generation and power control unit 600, is supplied to the controller power control unit 706 and the operation unit 500. The power source 2 is supplied mainly in the normal state.

The power source 3 which is an output of the power generation and power control unit 600, is supplied to the reader unit 300.

The power source 4 which is an output of the power generation and power control unit 600, is supplied to the printer unit 400.

The controller power control unit 706 generates the power sources 5 and 6 based on the power source 2. About 12V or 24V voltage is supplied from the power source 2. The controller power control unit 706 converts this power voltage into voltages according to ICs connected, and supplies the voltages as a plurality of power sources. The power source 5 is supplied to the main controller 701 and the ROM 702. The power source 6 is supplied to the contactless power feeding unit 100.

FIG. 6 illustrates power supply states of the digital MFP 10, i.e., power supply modes and power supply states in each power supply mode. Specifically, FIG. 6 illustrates five different power supply modes (power OFF, power-saving mode standby, power-saving mode wireless power feeding OFF, power-saving mode reader and printer OFF, and standard mode power ON), and power supply states of the power sources 1 to 6 in each power supply mode.

The power generation and power control unit 600 carries out each power supply mode via the I/O controller 704 when the main controller 701 executes a relevant program stored in the ROM 702. The I/O controller 704 also issues an instruction to the power generation and power control unit 600 when a built-in CPU of the I/O controller 704 executes a relevant program stored in a built-in ROM thereof.

In the power OFF mode, the power switch of the apparatus is turned OFF, and all of the power sources 1 to 6 (outputs of the power generation and power control unit 600) are OFF.

In the power-saving mode standby state, the digital MFP 10 is in the standby state with reduced power consumption, only the power source 1 is supplied, and the digital MFP 10 is activated in the standard mode in which a return factor is input.

In the power-saving mode wireless power feeding OFF state, only the controller unit 700 is operating, and the power sources 1, 2, and 5 are supplied. Also in this state, the power source 1 is supplied to a part of the contactless power feeding unit 100, the power source 6 for detecting a return factor is input, and the digital MFP 10 performs normal operations.

In the power-saving mode reader and printer OFF state, the power supply to the reader unit 300 and the printer unit 400 is turned OFF, and the power sources 1, 2, 5, and 6 are supplied.

In the standard mode power ON state, all of the power sources 1 to 6 are supplied (power ON state).

Referring to FIG. 6, the power supply state (power supply mode) changes such that power consumption decreases in order of standard mode power ON (mode 1), power-saving mode reader and printer OFF (mode 2), power-saving mode wireless power feeding OFF (mode 3), and power-saving mode standby (mode 4) (the mode 1, the mode 2, the mode 3, and the mode 4 in this order). The power OFF state can be entered from any state.

(Power Control)

Figure 7:
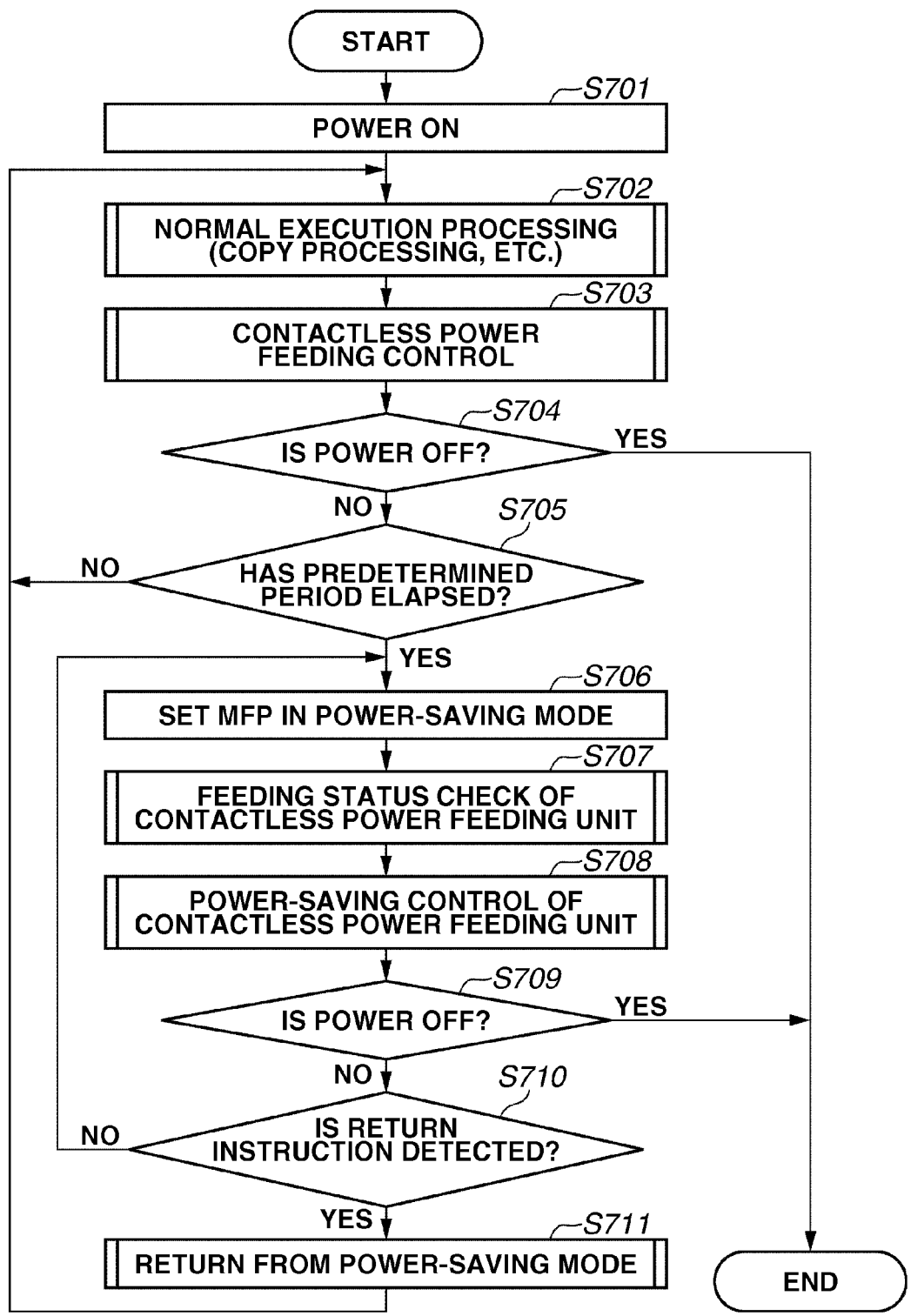
FIG. 7 is a flowchart illustrating power control performed by a digital multifunction peripheral according to an exemplary embodiment.

FIG. 7 is a flowchart illustrating power control performed by the digital MFP 10. The processing illustrated in FIG. 7 is achieved when the main controller 701 in the controller unit 700 of the digital MFP 10 executes a relevant program stored in the ROM 702.

The processing illustrated in FIG. 7 includes four stages of processing: power ON processing (step S701), regular processing, such as copy processing, and wireless power feed processing (steps S702 and S703), power-saving control processing (steps S706, S707, and S708), and processing for returning from the power-saving mode (steps S710 and S710).

In step S701, the power is input into the digital MFP 10 and performs the power ON processing. In step S702, the digital MFP 10 recognizes operator's instructions, and performs the regular processing. Regular processing includes, for example, copy processing, print processing, and document read processing.

In step S703, the digital MFP 10 performs a series of contactless power feeding control processing, including the identification and authentication of the terminal apparatus 200, requesting to prepare for the contactless power feed processing, and the contactless power feed processing, on the terminal apparatus 200 from the contactless power feeding unit 100. The contactless power feeding control processing will be described below with reference to FIG. 8.

In step S704, the digital MFP 10 determines whether the power switch is turned OFF. When the power switch is turned OFF (YES in step S704), the processing proceeds to the ending sequence, and the digital MFP 10 turns OFF the power thereof. When the power switch is not turned OFF (NO in step S704), the processing proceeds to step S705.

In step S705, the digital MFP 10 determines whether a state where none of screen operation on the operation unit 500, copy processing, print processing, document read processing, etc. is executed has continued for a predetermined period after completion of processing of the digital MFP 10. When it is not determined that the state has continued until the predetermined period has elapsed (NO in step S705), i.e., when the next operation is started before the predetermined period has elapsed, the processing returns to step S702 and the digital MFP 10 repeats the regular processing. Otherwise, when it is determined that the relevant state has continued for the predetermined period (YES in step S705), then in step S706, the digital MFP 10 shifts to the power-saving mode in which power consumption is reduced.

Processing for shifting to the power-saving mode will be described below.

Various settings can be made as for the processing for shifting to the power-saving mode. Although initial values are preset, these settings can be changed by operations performed on the operation unit 500 by the operator.

The power-saving mode shifts from the mode 1 (standard mode) to the mode 2, from the mode 2 to the mode 3, and from the mode 3 to the mode 4 in this order. The following describes conditions and settings for shifting to the mode 2, the mode 3, and the mode 4.

(Common Power-Saving Settings)

A setting 1 (Period for shifting from the mode 1 to the mode 2) . . . 10 minutes (variable from 1 to 120 minutes)

A setting 2 (Setting for shifting from the mode 2 to the mode 3) . . . . Selection of the wireless power feeding priority mode or the MFP priority mode . . . . Initial setting: Wireless power feeding priority mode A setting 3 (Period for shifting from the mode 3 to the mode 4) . . . 10 minutes (variable from 1 to 120 minutes)

The setting 1 sets a period for shifting from the mode 1 to the mode 2. When the controller unit 700 detects that a state where none of screen operation on the operation unit 500, copy processing, etc. is executed has continued for a preset period (the initial value is 10 minutes) in the mode 1, the digital MDP 10 shifts to the mode 2.

The setting 2 sets a period for shifting from the mode 2 to the mode 3. There are two different methods for setting a period for shifting from the mode 2 to the mode 3: the wireless power feeding priority mode and the MFP priority mode. In the wireless power feeding priority mode, the controller unit 700 performs the power-saving processing giving priority to the wireless power feeding state. In the MFP priority mode, the controller unit 700 performs the power-saving processing giving priority to the processing for the reader unit 300 and the printer unit 400 of the digital MFP 10. The MFP priority mode is a mode for promptly shifting to the mode 3 when the processing of the reader unit 300 and the printer unit 400 is completed and the MFP 10 shifts to the mode 2.

The setting 3 sets a period for shifting from the mode 3 to the mode 4. When the I/O controller 704 of the controller unit 700 detects that a state where none of operation on the operation unit 500, etc. is executed has continued for a preset period (the initial value is 10 minutes) in the mode 3, the MFP 10 shifts to the mode 4.

(Settings in Wireless Power Feeding Priority Mode)

When the wireless power feeding priority mode is selected in the setting 2, the following settings are performed.

A setting 4 (Limitation of the number of power-fed devices in the mode 3) . . . . Initial values: Execute, Number of devices=1, High charging rate. The initial values can be changed to: Number of devices=2 or more, Low charging rate, Quick/Slow start of charging.

A setting 5 (Limitation of the power feeding area in the mode 3) . . . . Initial value: Execute. The initial value can be changed to Not Execute.

A setting 6. Wireless power feeding OFF in the mode 3

A setting 6-1. When the terminal charging rate is 50% or below, charging is continued until the charging rate reaches 50% (variable from 10% to 100%).

A setting 6-2. When the terminal charging rate is 50% or above, charging is continued until the charging rate reaches 80% (variable from 50% to 100%).

A setting 7. Maximum charging period of 60 minutes in the settings 4 to 6 (variable from 30 to 120 minutes)

The setting 4 sets a method for limiting the number of power-fed devices in the mode 3. As a power-saving method for the contactless power feeding unit 100, the upper limit of the number of power-fed devices can be specified. A power-saving method can be selected from a method for limiting the number of devices to "High charging rate", a method for limiting the number of devices to "Low charging rate", a method for limiting the number of devices to "Quick start of charging", and a method for limiting the number of devices to "Slow start of charging".

The setting 5 relates to the limitation of the wireless power feeding area in the mode 3. As a power-saving method for the contactless power feeding unit 100, the wireless power feeding area can be reduced. When performing the limitation of the power feeding area, the power feeding area is limited to the 50% area.

The setting 6 relates to settings for turning OFF the operation for charging the terminal apparatus 200 by the contactless power feeding unit 100 in the mode 3. When the charging rate of the terminal apparatus 200 is 50% or less, a limitation of the charging rate of the terminal apparatus 200 can be set.

Further, when the charging rate of the terminal is 50% or above, the charging rate of the terminal apparatus 200 can be set.

The setting 7 enables setting of the maximum period for performing power-saving control in the settings 4 to 6. When the period set in the setting 7 has elapsed, the digital MFP 10 ends wireless power feeding.

(Settings in MFP Priority Mode)

When the MFP priority mode is selected in the setting 2, the following setting is performed.

A setting 8 (OFF period of the contactless power feeding unit 100 in shifting to the mode 3) . . . 10 minutes (variable from 1 to 120 minutes)

The setting 8 sets the OFF period of the contactless power feeding unit 100 in shifting to the mode 3. In this case, the digital MFP 10 performs neither the limitation of the number of power-fed devices nor the limitation of the power feeding area, and, when a preset period has elapsed, ends the power feed processing by the contactless power feeding unit 100.

In steps S706 to S708, the digital MFP 10 performs power-saving control.

In step S706, the digital MFP 10 controls units other than the contactless power feeding unit 100. When a preset period for shifting from the mode 1 to the mode 2 has elapsed, the digital MFP 10 performs the processing for shifting to the mode 2. Specifically, the digital MFP 10 turns OFF the power sources 3 and 4 to turn OFF the power of the reader unit 300 and the power of the printer unit 400 to reduce power consumption.

In step S707, the digital MFP 10 checks the feeding status of the contactless power feeding unit 100. Processing for checking the feeding status of the contactless power feeding unit 100 will be described below with reference to FIG. 9.

In step S708, the digital MFP 10 performs the power-saving processing on the contactless power feeding unit 100 depending on the status detected in step S707 and the power-saving setting. Processing for power-saving control for the contactless power feeding unit 100 will be described below with reference to FIG. 10.

In step S709, similar to step S704, the digital MFP 10 determines whether the power switch has been turned OFF. When it is determined that the power switch has been turned OFF (YES in step S709), the MFP 10 proceeds to the processing end sequence, and turns OFF the power thereof. When it is determined that the power switch has not been turned OFF (NO in step S709), the processing proceeds to step S710.

In step S710, until an instruction for returning from the power-saving mode, such as an operation on the operation unit 500, is detected, the digital MFP 10 continues power-saving control in steps S706 to S708 where the power supply mode is shifted from the mode 2 to the mode 3, and from the mode 3 to the mode 4. In step S710, when the digital MFP 10 detects an instruction for returning from the power-saving mode (YES in step S710), then in step S711, the digital MFP 10 performs the power input processing to return to the mode 1.

Specifically, in step S711, the digital MFP 10 performs the processing for returning from the power-saving mode in which power consumption is reduced, and then the processing returns to step S702. Processing for returning from the power-saving mode will be described below with reference to FIG. 11.

Figure 8:
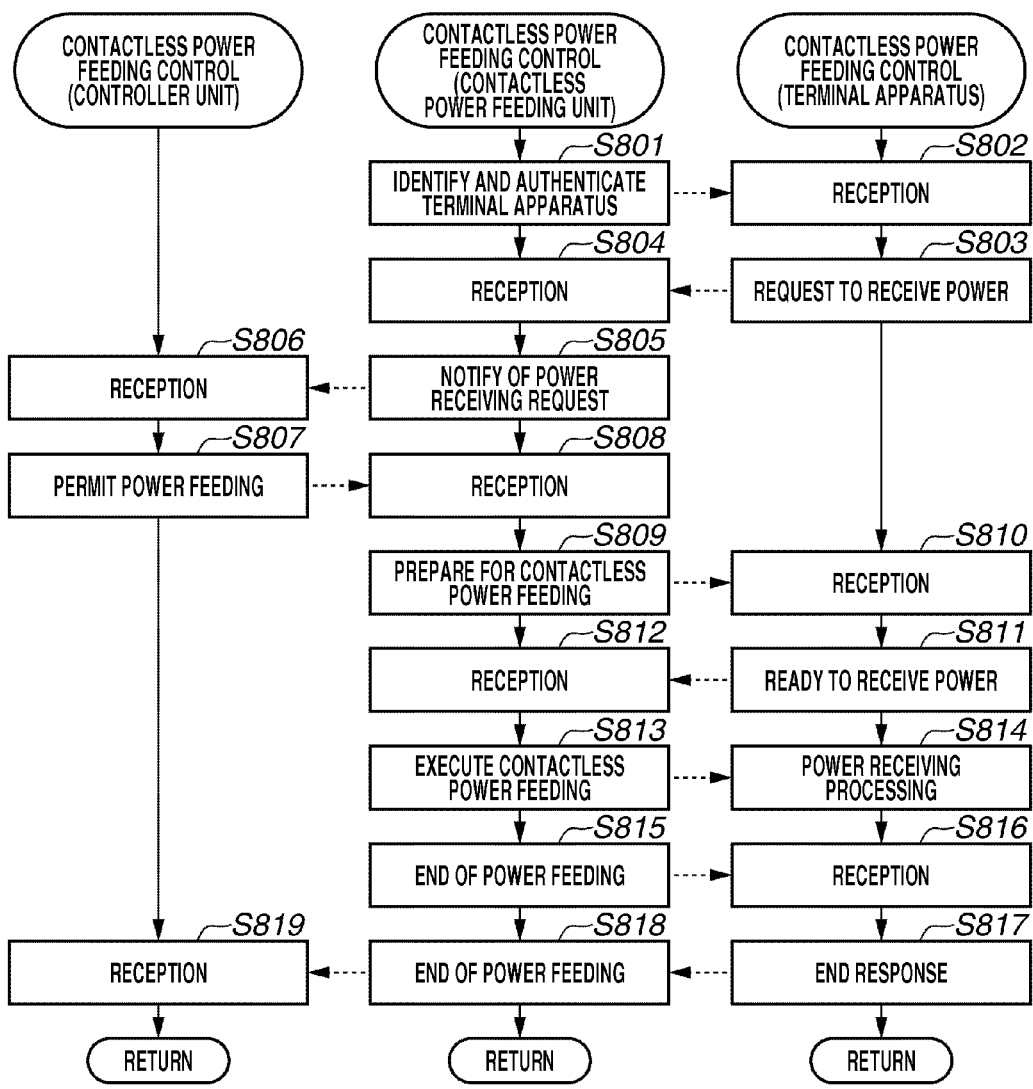
FIG. 8 is a flowchart illustrating details of contactless power feeding control processing illustrated in FIG. 7.

The following describes details of the contactless power feeding control processing in step S703 illustrated in FIG. 7, with reference to FIG. 8. Processing by the controller unit 700 is achieved when the main controller 701 executes a program stored in the ROM 702, and issues a control instruction to the contactless power feeding unit 100 via the I/O controller 704. Further, processing by the contactless power feeding unit 100 is achieved when the CPU 105 executes a program stored in the ROM 106. The CPU 105 communicates with the main controller 701 via the I/O controller 704. Processing by the terminal apparatus 200 is achieved when the CPU 205 executes a relevant program stored in the ROM 206.

In step S801, the contactless power feeding unit 100 performs the processing for identifying and authenticating the terminal apparatus 200 placed in the area 111 of the contactless power feeding unit 100. Then, by broadcast transmission, the contactless power feeding unit 100 notifies the terminal apparatus 200 of the start of power feeding.

In step S802, the terminal apparatus 200 receives a broadcast from the contactless power feeding unit 100.

In step S803, when the terminal apparatus 200 demands to receive the power through contactless power feeding, the terminal apparatus 200 notifies the contactless power feeding unit 100 of the ID thereof together with a demand to receive the power as a power feeding request. When there is a plurality of terminal apparatuses 200, the terminal apparatuses 200 sequentially notify the contactless power feeding unit 100 of the IDs thereof.

In steps S804 and S805, the contactless power feeding unit 100 receives the power feeding request from the terminal apparatus 200, and notifies the controller unit 700 of the reception of a power feeding request.

In steps S806 and S807, the controller unit 700 receives the notification of a power feeding request from the contactless power feeding unit 100, determines whether power feeding is possible, and, if power feeding is possible, notifies the contactless power feeding unit 100 of a power feeding permission.

In steps S808 and S809, the contactless power feeding unit 100 receives the notification of the power feeding permission from the controller unit 700, and starts preparation for contactless power feeding. In the preparation for contactless power feeding, the contactless power feeding unit 100 specifies the terminal apparatus 200 based on the ID received from the terminal apparatus 200. When the power is simultaneously fed to a plurality of terminal apparatuses 200, the contactless power feeding unit 100 sequentially changes the ID to specify target terminal apparatuses 200.

In steps S810 and S811, the terminal apparatus 200 recognizes a target device for power feeding based on the ID, and performs the preparation for power reception. When the terminal apparatus 200 completes the preparation for power reception, the terminal apparatus 200 notifies the contactless power feeding unit 100 of completion of preparation for power reception.

In steps S812 and S813, the contactless power feeding unit 100 receives the notification of the completion of preparation for power reception from the terminal apparatus 200, and performs the contactless power feed processing for a predetermined period.

In step S814, the terminal apparatus 200 performs the power reception processing, and charges the battery 210.

In step S815, the contactless power feeding unit 100 measures the elapsed power feeding period and, when a predetermined period has elapsed, completes the contactless power feed processing, and then notifies the terminal apparatus 200 of the completion of power feed processing.

In steps S816 and S817, the terminal apparatus 200 receives the notification of the completion of power feed processing from the contactless power feeding unit 100. Thus, the terminal apparatus 200 completes the power reception processing, notifies the contactless power feeding unit 100 of the completion of power reception processing as an end response, and ends the processing of this flowchart.

In step S818, the contactless power feeding unit 100 receives the notification of the completion of the power reception processing from the terminal apparatus 200. Thus, the contactless power feeding unit 100 completes the contactless power feed processing, notifies the controller unit 700 of completed contactless power feed processing, and ends the processing of this flowchart.

In step S819, the controller unit 700 receives the notification of the completion of power feed processing from the contactless power feeding unit 100, and ends the processing of this flowchart.

Figure 9:
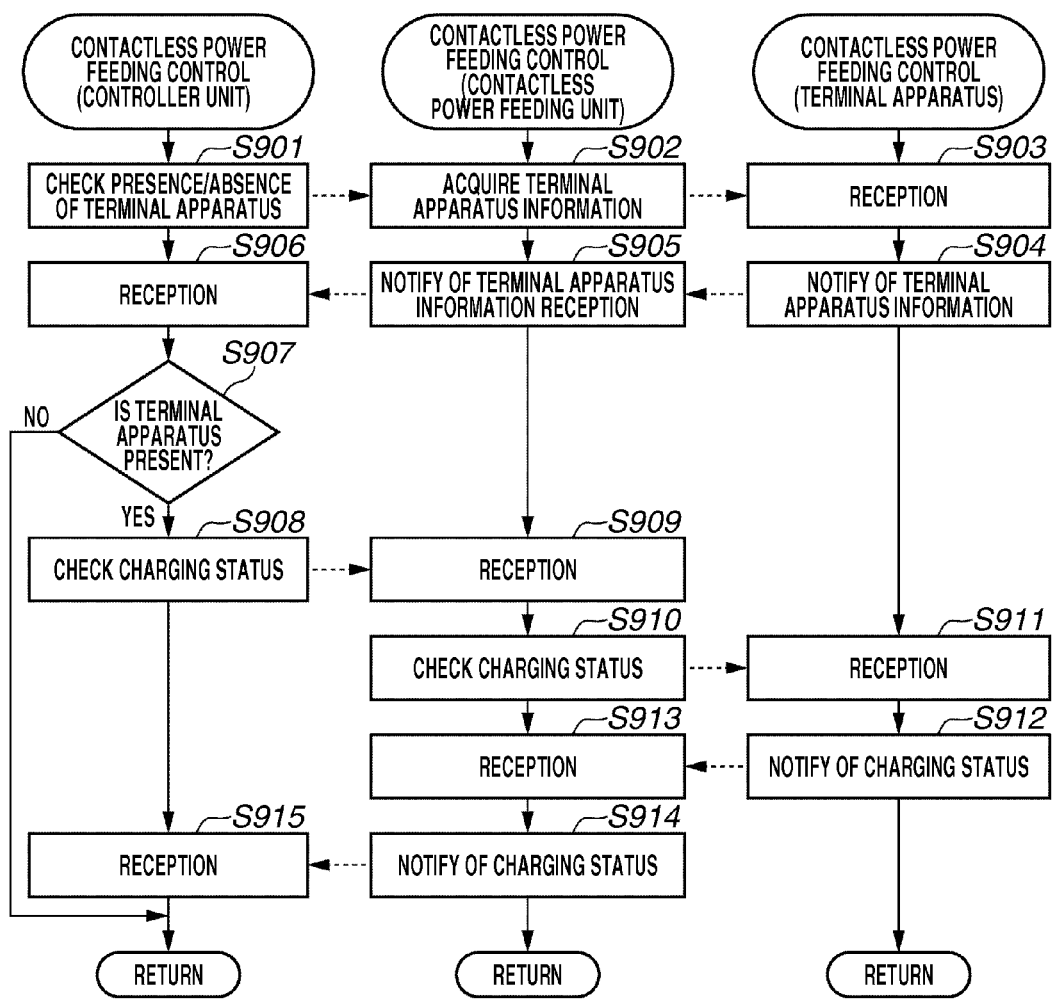
FIG. 9 is a flowchart illustrating details of processing for feeding status check of the contactless power feeding unit illustrated in FIG. 7.

The following describes details of the processing for checking the feeding status of the contactless power feeding unit 100 in step S707 illustrated in FIG. 7, with reference to FIG. 9. Processing by the controller unit 700 is achieved when the main controller 701 executes a relevant program stored in the ROM 702, and issues a control instruction to the contactless power feeding unit 100 via the I/O controller 704. Further, processing by the contactless power feeding unit 100 is achieved when the CPU 105 executes a relevant program stored in the ROM 106. The CPU 105 communicates with the main controller 701 via the I/O controller 704. Processing by the terminal apparatus 200 is achieved when the CPU 205 executes a relevant program stored in the ROM 206.

In steps S901 to S906, the controller unit 700 checks the presence or absence of the terminal apparatus 200 via the contactless power feeding unit 100, and acquires information about the terminal apparatus 200.

In step S907, the controller unit 700 determines whether the terminal apparatus 200 is placed on the area 111 of the contactless power feeding unit 100. When the terminal apparatus 200 is detected (YES in step S907), then in step S908, the controller unit 700 notifies the contactless power feeding unit 100 of the necessity of charging status check.

Otherwise, when the terminal apparatus 200 is not detected (NO in step S907), the controller unit 700 ends the processing of this flowchart.

In steps S909 and S910, the contactless power feeding unit 100 receives the notification of the charging status check from the controller unit 700, and notifies the terminal apparatus 200 of the charging status check result.

In steps S911 and S912, the terminal apparatus 200 receives the notification of the charging status check result from the contactless power feeding unit 100. Thus, the terminal apparatus 200 makes a judgment on the charging status of the battery 210, notifies the contactless power feeding unit 100 of the charging status (amount of charge, remaining period, etc.), and ends the processing of this flowchart.

In steps S913 and S914, the contactless power feeding unit 100 receives the notification of the charging status from the terminal apparatus 200, notifies the controller unit 700 of the charging status, and ends the processing of this flowchart.

In step S915, the controller unit 700 receives the notification of the charging status from the contactless power feeding unit 100, and ends the processing of this flowchart.

As described above, in step S707 illustrated in FIG. 7, the controller unit 700 checks the presence or absence of the terminal apparatus 200 (steps S901 to S906), and checks the charging status of the terminal apparatus 200 (steps S907 to S915).

Figure 10:
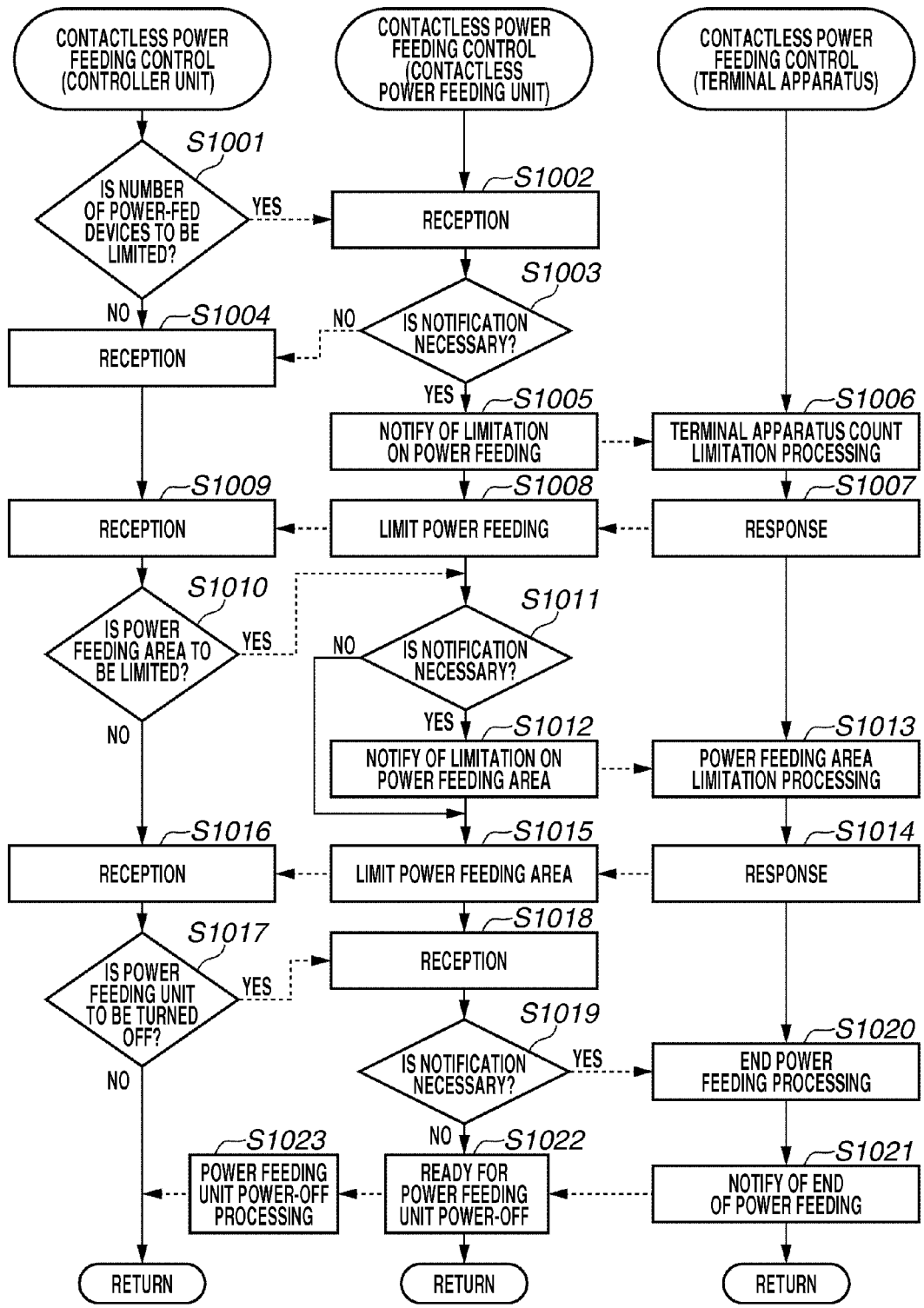
FIG. 10 is a flowchart illustrating details of processing for power-saving control of the contactless power feeding unit illustrated in FIG. 7.

The following describes details of the processing for power-saving control of the contactless power feeding unit 100 in step S708 illustrated in FIG. 7, with reference to FIG. 10. Processing by the controller unit 700 is achieved when the main controller 701 executes a relevant program stored in the ROM 702, and issues a control instruction to the contactless power feeding unit 100 via the I/O controller 704. Processing by the contactless power feeding unit 100 is achieved when the CPU 105 executes a relevant program stored in the ROM 106. The CPU 105 communicates with the main controller 701 via the I/O controller 704. Processing by the terminal apparatus 200 is achieved when the CPU 205 executes a relevant program stored in the ROM 206.

Referring to FIG. 9, the main controller 701 of the controller unit 700 controls the contactless power feeding unit 100 and the power feeding to the terminal apparatus 200 based on the result of the check in step S707, common power-saving settings, and settings of the wireless power feeding priority mode or settings of the MFP priority mode. When the terminal apparatus 200 is not detected (NO in step S907), the digital MFP 10 turns OFF the power of the contactless power feeding unit 100.

The following describe a case where the common power-saving setting 2 selects the wireless power feeding priority mode.

In step S1001, based on the setting 4 among settings for the wireless power feeding priority mode, the controller unit 700 determines whether the number of power-fed terminal apparatuses 200 is to be limited. When the number of power-fed terminal apparatuses 200 is to be limited (YES in step S1001), the controller unit 700 notifies the contactless power feeding unit 100 of the limitation. Otherwise, when the number of power-fed terminal apparatuses 200 is not to be limited (NO in step S1001), the processing proceeds to step S1004.

In steps S1002 and S1003, the contactless power feeding unit 100 receives the notification of the limitation from the controller unit 700, and determines the necessity of notification to the terminal apparatus 200 in order to limit the number of power-fed terminal apparatuses 200. For example, when the contactless power feeding unit 100 is simultaneously feeding the power to a plurality of terminal apparatus 200, in step S1005, the contactless power feeding unit 100 notifies a terminal apparatus 200 to which power feeding is stopped, of the power feeding limitation.

When the contactless power feeding unit 100 is not simultaneously feeding the power to a plurality of terminal apparatus 200, the contactless power feeding unit 100 notifies the controller unit 700 of the unnecessity of the power feeding limitation.

In step S1004, the controller unit 700 receives the notification of the unnecessity of the power feeding limitation from the contactless power feeding unit 100.

In step S1006 and S1007, the terminal apparatus 200 receives the notification of the power feeding limitation from the contactless power feeding unit 100, completes the power reception processing, and notifies the contactless power feeding unit 100 of the completion of the power reception processing as an end response.

In step S1008, the contactless power feeding unit 100 performs the processing for limiting the number of power-fed terminal apparatuses 200, and notifies the controller unit 700 of the limitation processing execution.

In step S1009, the controller unit 700 receives the notification of the limitation processing execution from the contactless power feeding unit 100.

In step S1010, the controller unit 700 determines whether the power feeding area is to be limited based on the setting 5 among settings for the wireless power feeding priority mode. When the power feeding area is to be limited (YES in step S1010), the controller unit 700 notifies the contactless power feeding unit 100 of the power feeding area limitation. Otherwise, when the power feeding area is not to be limited (NO in step S1010), the processing proceeds to step S1016.

In step S1011, the contactless power feeding unit 100 receives the notification of the power feeding area limitation from the controller unit 700, and determines the necessity of notification to the terminal apparatus 200 in order to limit the power feeding area. When the notification to the terminal apparatus 200 is required (YES in step S1011), then in step S1012, the contactless power feeding unit 100 notifies the terminal apparatus 200 on which the power feeding area limitation is imposed, of the power feeding area limitation. When the notification is not required (NO in step S1011), the processing proceeds to step S1015.

In steps S1013 and S1014, the terminal apparatus 200 receives the notification of the power feeding area limitation, completes the power reception processing, and notifies the contactless power feeding unit 100 of the completion of the power reception processing as an end response.

In step S1015, the contactless power feeding unit 100 performs the processing for limiting the power feeding area to reduce the power feeding area, and notifies the controller unit 700 of the limitation processing execution. The power feeding area limitation is achieved by limiting the amount of power feeding per unit of time.

In step S1016, the controller unit 700 receives the notification of the limitation processing execution from the contactless power feeding unit 100.

In step S1017, the controller unit 700 determines whether the power of the contactless power feeding unit 100 is to be turned OFF based on the setting 6 among settings for the wireless power feeding priority mode. When the power of the contactless power feeding unit 100 is to be turned OFF (YES in step S1017), the controller unit 700 notifies the contactless power feeding unit 100 that the power of the contactless power feeding unit 100 is to be turned OFF. Otherwise, when the power of the contactless power feeding unit 100 is not to be turned OFF (NO in step S1017), the controller unit 700 ends the processing of this flowchart.

In steps S1018 and S1019, the contactless power feeding unit 100 receives the notification of power OFF from the controller unit 700, and determines the necessity of notification to the terminal apparatus 200 in order to turn OFF the power. When the notification to the terminal apparatus 200 is required (YES in step S1019), the contactless power feeding unit 100 notifies the terminal apparatus 200 that the power of the contactless power feeding unit 100 is to be turned OFF. When the notification to the terminal apparatus 200 is not required (NO in step S1019), the processing proceeds to step S1022.

In steps S1020 and S1021, the terminal apparatus 200 receives the notification of power OFF, completes the power reception processing, and notifies the contactless power feeding unit 100 of the completion of the power reception processing as an end response.

In step S1022, the contactless power feeding unit 100 notifies the controller unit 700 of completion of preparation for power OFF.

In step S1023, the controller unit 700 performs the processing for turning OFF the power of the contactless power feeding unit 100. In the power-OFF processing, the controller unit 700 supplies the minimum power enabling the contactless power feeding unit 100 to detect the terminal apparatus 200.

When the MFP priority mode is set in the power-saving setting 2, the number of power-fed terminal apparatuses 200 is not limited (NO in step S1001), and the processing proceeds to step S1010.

Further, the power feeding area is not limited also in step S1010 (NO in step S1010), and the processing proceeds to step S1017.

In step S1017, when the period set in the setting 8 in the MFP priority mode has elapsed, the contactless power feeding unit 100 turns OFF the power thereof in steps S1018 to S1023, and completes the processing for shifting to power-saving wireless feeding OFF (mode 3).

Figure 11:
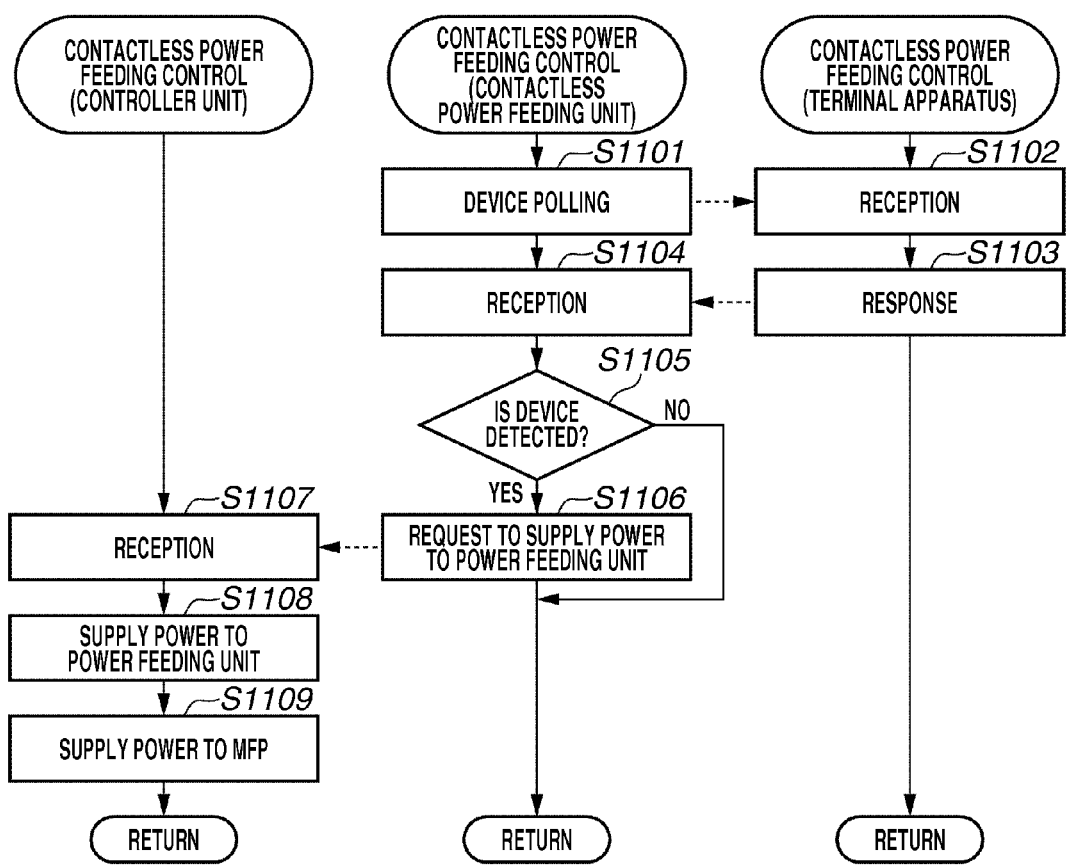
FIG. 11 is a flowchart illustrating details of processing for returning from the power-saving mode illustrated in FIG. 7.

The following describes details of the processing for returning from the power-saving mode in step S709 illustrated in FIG. 7, with reference to FIG. 11. Processing by the controller unit 700 is achieved when the main controller 701 executes a relevant program stored in the ROM 702, and issues a control instruction to the contactless power feeding unit 100 via the I/O controller 704. In addition, the CPU executes a relevant program stored in the ROM in the I/O controller 704. Processing by the contactless power feeding unit 100 is achieved when the CPU 105 executes a relevant program stored in the ROM 106. The CPU 105 communicates with the main controller 701 via the I/O controller 704. Processing by the terminal apparatus 200 is achieved when the CPU 205 executes a relevant program stored in the ROM 206.

In step S1101, the contactless power feeding unit 100 performs polling to detect the terminal apparatus 200. Specifically, the contactless power feeding unit 100 performs the communication processing and checks a response from the terminal apparatus 200.

In steps S1102 and S1103, the terminal apparatus 200 placed on the contactless power feeding unit 100 detects polling from the contactless power feeding unit 100, and issues a power feeding request when the terminal apparatus 200 demands power feeding.

In steps S1104 and S1105, the contactless power feeding unit 100 checks the response from the terminal apparatus 200 to determine whether the terminal apparatus 200 demands the power feed processing. When the contactless power feeding unit 100 determines that the terminal apparatus 200 does not demand the power feed processing (NO in step S1105), the contactless power feeding unit 100 ends the processing of this flowchart. For example, when the contactless power feeding unit 100 detects again a terminal apparatus 200 placed during power-saving control, the contactless power feeding unit 100 determines that the terminal apparatus 200 does not demand power feeding. Alternatively, the time elapsed since the last contactless power feed processing can be used as a criterion for determining the necessity of power feeding.

When the contactless power feeding unit 100 determines that the terminal apparatus 200 demands the power feed processing (YES in step S1105), then in step S1106, the contactless power feeding unit 100 notifies the I/O controller 704 of the controller unit 700 of the activation of power sources for power feeding.

In step S1107, the I/O controller 704 of the controller unit 700 receives the notification of the activation of power sources for power feeding from the contactless power feeding unit 100.

In step S1108, the I/O controller 704 instructs the power generation and power control unit 600 to output the power source 2. The power source 2 is input into the controller power control unit 706, which outputs the power sources 5 and 6. The power source 6 is supplied to the contactless power feeding unit 100.

In step S1109, the power source 5 is supplied to the controller unit 700, and the main controller 701 of the controller unit 700 is activated. The main controller 701 controls the power output of the entire digital MFP 10. Specifically, the main controller 701 controls the power generation and power control unit 600 via the I/O controller 704 to output the power sources 3 and 4 and activate the reader unit 300 and the printer unit 400, respectively.

As described above, according to the present invention, the digital MFP 10 having a short-range contactless power feeding function is able to perform power-saving control in which power consumption is reduced based on the status of the digital MFP 10 and the status of the terminal apparatus 200 as a power receiving apparatus.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-039126 filed Feb. 28, 2013, which is hereby incorporated by reference herein in its entirety.

What is claimed is:

1. A printing apparatus comprising:
   a contactless power feeding unit configured to feed power wirelessly to a power receiving apparatus; and
   a control unit configured to determine whether it is necessary to stop power feeding to the contactless power feeding unit based on a power-saving setting of the printing apparatus, in a case where the printing apparatus shifts to a power-saving mode,
   wherein the control unit stops power feeding to the contactless power feeding unit, in a case where it is determined that it is necessary to stop power feeding to the contactless power feeding unit, and
   wherein power feeding to the contactless power feeding unit is continued in the power-saving mode, in a case where it is determined that it is not necessary to stop power feeding to the contactless power feeding unit.

2. The printing apparatus according to claim 1, wherein the printing apparatus is a digital multifunction peripheral including the contactless power feeding unit, an image input device, and an image output device.

3. A method for controlling a printing apparatus, the method comprising:
   feeding power wirelessly to a power receiving apparatus by a contactless power feeding unit;
   determining whether it is necessary to stop power feeding to the contactless power feeding unit based on a power-saving setting of the printing apparatus, in a case where the printing apparatus shifts to a power-saving mode; and
   stopping power feeding to the contactless power feeding unit, in a case where it is determined that it is necessary to stop power feeding to the contactless power feeding unit, and
   wherein power feeding to the contactless power feeding unit is continued in the power-saving mode, in a case where it is determined that it is not necessary to stop power feeding to the contactless power feeding unit.

4. A printing apparatus comprising:
   a printer configured to form an image on paper;
   a contactless power feeding unit configured to feed power wirelessly to a power receiving apparatus; and
   a control unit configured to determine whether it is necessary to stop power feeding to the contactless power feeding unit based on a power-saving setting of the printing apparatus, in a case where the printing apparatus shifts to a power-saving mode in which power feeding at least to the printer is stopped,
   wherein the control unit stops power feeding to the contactless power feeding unit, in a case where it is determined that it is necessary to stop power feeding to the contactless power feeding unit, and
   wherein power feeding to the contact power feeding unit is continued in the power-saving mode, in a case where it is determined that it is not necessary to stop power feeding to the contactless power feeding unit.

5. A method for controlling a printing apparatus, the method comprising:
   forming an image on paper;
   feeding power wirelessly to a power receiving apparatus by a contactless power feeding unit;
   determining whether it is necessary to stop power feeding to the contactless power feeding unit based on a power-saving setting of the printing apparatus, in a case where the printing apparatus shifts to a power-saving mode in which power feeding at least to the printer is stopped; and
   stopping power feeding to the contactless power feeding unit, in a case where it is determined that it is necessary to stop power feeding to the contactless power feeding unit, and
   wherein power feeding to the contact power feeding unit is continued in the power-saving mode, in a case where it is determined that it is not necessary to stop power feeding to the contactless power feeding unit.

* * * * *